(12) United States Patent
Sauter et al.

(10) Patent No.: US 6,925,694 B2
(45) Date of Patent: Aug. 9, 2005

(54) TOOL TURRET

(75) Inventors: Reiner Sauter, Metzingen (DE); Detlef Sahm, Lichtenwald (DE)

(73) Assignee: Sauter Feinmechanik GmbH, Metzingen (DE)

( * ) Notice: Subject to any disclaimer, the term of this patent is extended or adjusted under 35 U.S.C. 154(b) by 0 days.

(21) Appl. No.: 10/469,249

(22) PCT Filed: Jun. 18, 2002

(86) PCT No.: PCT/EP02/06689
§ 371 (c)(1),
(2), (4) Date: Aug. 28, 2003

(87) PCT Pub. No.: WO03/000459
PCT Pub. Date: Jan. 3, 2003

(65) Prior Publication Data
US 2004/0103510 A1 Jun. 3, 2004

(30) Foreign Application Priority Data
Jun. 23, 2001 (DE) ........................ 101 30 446

(51) Int. Cl.⁷ ............................ B23P 23/02; B23B 29/32
(52) U.S. Cl. ................. 29/40; 29/39; 408/35; 74/813 R
(58) Field of Search ............................ 29/40, 35.5, 39, 29/48.5 A, 48.5 R, 26 R, 26 A, 33 J; 408/35; 82/121; 74/813 R

(56) References Cited

U.S. PATENT DOCUMENTS

| 1,803,402 A | 5/1931 | Napier | |
| 4,090,281 A | 5/1978 | Hautau | |
| 4,872,244 A | * 10/1989 | Schleich | 29/40 |
| 4,991,474 A | * 2/1991 | Thumm et al. | 29/35.5 |
| 5,168,614 A | * 12/1992 | Thumm | 29/40 |
| 5,720,090 A | * 2/1998 | Dawson, Jr. | 29/40 |
| 5,730,691 A | * 3/1998 | Tokura et al. | 29/40 |
| 6,237,212 B1 | * 5/2001 | Speller et al. | 29/33 J |
| 6,276,035 B1 | * 8/2001 | Hessbruggen et al. | 29/40 |
| 6,722,005 B2 | * 4/2004 | Sauter et al. | 29/40 |

FOREIGN PATENT DOCUMENTS

| DE | 3900443 | 7/1989 |
| DE | 3904631 | 8/1990 |
| DE | 4018543 | 8/1991 |

* cited by examiner

Primary Examiner—Derris H. Banks
Assistant Examiner—Dana Ross
(74) Attorney, Agent, or Firm—Roylance, Abrams, Berdo & Goodman, L.L.P.

(57) ABSTRACT

A tool turret includes a housing (10) for connection to a machine tool, and an electric drive motor (28). A tool disk (14), is mounted to rotate relative to the housing (10) about a longitudinal axis (34), may be fixed in selected angular positions, and has recesses (16) for machining tools (18). At least one rotating machining tool (18) may be driven by the drive motor (28) using shafts (24, 30), extending perpendicular to the longitudinal axis forming the swiveling axis of the tool disk (14). The electric drive motor (28) is arranged within the tool disk (14). The driveshaft (30) from the electric drive (28) is aligned with the driveshaft (24) for the machining tool (18), and is aligned with the driveshaft (24) for the machining tool (18) or extends parallel to it. An economical drive design for machining tools on a tool turret is achieved, with a small installation volume.

16 Claims, 2 Drawing Sheets

TOOL TURRET

FIELD OF THE INVENTION

The present invention relates to a tool turret having a housing to be connected to a machine tool, with an electric drive motor. A tool disk is mounted rotatably relative to the housing, may be fixed in selectable angular positions, and has recesses for machining tools. At least one rotating machining tool is driven by a drive motor by shafts extending perpendicular to the longitudinal axis representing the pivot axis for the tool disk.

BACKGROUND OF THE INVENTION

DE 40 18 543 C1 discloses a tool turret having a housing to be connected to the machine tool. The housing has an electric drive motor and a tool disk mounted rotatably relative to the housing. The tool disc has recesses for machining tools, at least one of which is configured for rotatable mounting of the tool. The machining tool may be driven by the drive motor by shafts which are interconnected by gearing. A hollow column is mounted concentrically with the axis of rotation of the tool disk, and has at least one line included in a system provided for transmission of energy, lubricant, coolant, pressure means, or auxiliary forms of energy. The hollow column is immobile relative to the housing. One of the shafts driven by the drive motor is mounted in the hollow column and connected by the gearing to the other shaft by way of which the rotatably mounted tool may be driven when the recess into which this tool is introduced is in the operating position.

This tool turret permits transmitting the auxiliary forms of energy or auxiliary means to the tool modules, tools, or the tools requiring such forms of energy, in a space conserving, problem-free, simple, and cost-effective manner. However, in that the drive system involves shafts and gearing, the tool drive configuration still requires much structural space. Because of the large number of elements, the drive system is also subject to wear, is correspondingly cost intensive in production, and requires a certain degree of maintenance.

DE 39 00 443 A1 discloses a variable-angle packaged unit for machine tools including turret heads. Fixable cutters are retained in recesses mounted pivotably about a stationary table element along a longitudinal axis. Two table elements of the turret head are mounted pivotably relative to each other around the longitudinal axis by an electric drive integrated into the tool disk. Appropriate gearing down for the rotatable table element by way of a planet gear unit is possible. Driving of rotating machine tools is not possible.

DE 39 04 631 A1 discloses another turret head solution for machine tools, for turning machines in particular. An insertible rotating machine tool is driven by gearing and the drive shaft for the machine tool extending parallel to the main drive shaft for the turret head. The turret head is in the form of a tool disk. The central electric drive is positioned outside the table unit of the tool disk, so that a compact structure is not possible. In addition, since the electric drive is separated by a large axial distance from the tool disk driven by it together with the respective machining tool, inaccuracies in control of the structural components (disk, tool) are not excluded.

SUMMARY OF THE INVENTION

Objects of the present invention are to provide an improved to tool turret having the advantages of conventional tool turrets and being cost-effective, taking up even less structural space, and permitting reduction of maintenance costs as a result of increase in reliability of operation.

The foregoing objects are obtained according to the present invention, by a tool turret with an electric drive motor mounted inside the tool disk, and with the driven shaft of the electric drive motor mounted to be aligned with or parallel to the drive shaft of a machining tool. The tool turret of the present invention suffices without costly shafts, the position of which is to be moved a number of times. The direct drive configuration permits the driven shaft of the electric drive motor to operate in alignment with the drive shaft of the machining tool. The overall configuration, that is, drive motor with corresponding shaft elements, may be integrated as one packaged unit directly into the tool disk to conserve space. No structural space is required outside the tool disk. Consequently, "slimline" exterior housing configurations may be achieved with this tool turret which is an advantage especially in view of the restricted space available in the case of machine tools which may be outfitted with the widest possible variety of tools and tool groups. In addition, production and maintenance costs are reduced as a result of the restricted variety of elements. The direct drive configuration also ensures zero backlash, an aspect which on the whole promotes machining accuracy. Advantageous embodiments are also obtained if the driven shaft is mounted in parallel with the drive shaft. With this parallel arrangement, between the shafts, a direct coupling or a gearing configuration may be provided, such as one in the form of toothed gearing for transmitting the power output of the motor to the machine tool. The structure of the present invention is distinctly compact and "slim."

In one especially preferred embodiment of the tool turret of the present invention, the electric drive is a brushless motor, an asynchronous motor or three-phase synchronous motor, preferably in the form of an interior rotor motor. The stator is connected to the housing of the motor with the coil windings, and encloses the rotor with the magnet elements. The rotor is connected to the driven shaft of the electric motor. Electric motors used for this purpose have continuous speed control. The speed is a function of the frequency of the current supplied but otherwise is more or less independent of the load, an aspect of particular advantage for machine tools which may be subjected to varying loads during machining. In addition, such electric motors may be used to reach very high motor speeds, ones which may quite possibly range from 15,000 rpm to 80,000 rpm. The motors used for the purpose may be provided for direct driving of the machine tool and are very compact. Because of their high speeds, such motors make high rated power available.

In another preferred embodiment of the tool turret of the present invention with at least one gear unit, preferably a single-stage or multistage planet gear unit, reduction of the speed of the drive motor occurs between the driven shaft of the electric drive motor and the drive shaft of the machine tool. The planet gear unit permits distinctly space-saving and reliably operating reduction of the high speed requirement of the electric motor. A customary machining speed may be made available for the machine tool by the speed reduction by way of the planet gear unit. Preferably, the driving gear of the planet gear unit is driven by the driven shaft of the electric drive motor. The drive wheel in turn drives at least one planet wheel of the gearing which always rolls along a stationary ringshaped gear housing element. The respective planet wheel transmits the drive output arising during circulation of the planet wheel to the drive shaft of the machine tool by way of a carrier element (web).

Should additional speed reduction prove to be necessary, advantageously an additional planet gear unit is present along with the first, one whose drive wheel may be driven by the driven shaft of the first planet gear unit and whose output arising during circulation of its respective planet gear unit may drive the drive shaft of the machining tool. Even very high-speed three-phase synchronous motors may be stepped down by the two planetary gear units to a nominal speed which may be classified as ideal for the drive of a machining tool. The speed may optionally be even further reduced by serial mounting of additional planet gear units.

In one preferred embodiment of the tool turret of the present invention, a coupling system is provided between the driven shaft of the drive motor and the output in the form of a shaft of the respective planet gear unit mounted last upstream from the drive shaft of the machining tool. The coupling system preferably may be controlled by a hydraulic operating system which in the coupled or uncoupled position drives the drive shaft of the machine tool for rotary propulsion of the machine tool or releases this shaft by means of the tool disk for a process of machine tool pivoting, respectively. The coupling system also permits release of the machine tool in an extremely short time for a machine tool pivoting process, and accordingly, introduction of a new tool for immediate driving. Consequently, the introduction and replacement processes proceed very rapidly. Every machining tool introduced as a replacement is immediately available for metal cutting.

In another especially preferred embodiment of the tool turret of the present invention, the drive motor is mounted on a support on the side of the housing to be stationary. The tool disk with its tool recesses is pivotably mounted around the support. The support forms a torque converter support. The forces and possibly vibrations associated with the high torque values of the drive and transmitted to the drive housing are diverted to the other housing by the torque converter support. As a result, the electric drive motor with its very high speeds is reliably held on the housing side, and in this way, is securely "anchored" for transmission of the high speeds.

In another preferred embodiment of the tool turret of the present invention, the electric drive motor may be cooled by a cooling device whose coolant lines extend into the support of the housing. The cooling device used permits controlling the amounts of heat associated with the high drive outputs, so that the machining accuracy is not impaired. Preferably, the hydraulic supply lines for the hydraulic operating device are mounted to extend at least to some extent into the support of the housing, with the lines for end position control of the coupling and/or operating device. In this way, all relevant supply and energy lines may be incorporated by design by way of the support into the pivotable tool disk with its integrated drive configuration.

Other objects, advantages and salient features of the present invention will become apparent from the following detailed description, which, taken in conjunction with the annexed drawings, discloses a preferred embodiment of the present invention.

BRIEF DESCRIPTION OF THE DRAWINGS

Referring to the drawings which form a part of this disclosure.

DETAILED DESCRIPTION OF THE INVENTION

Figure 1:
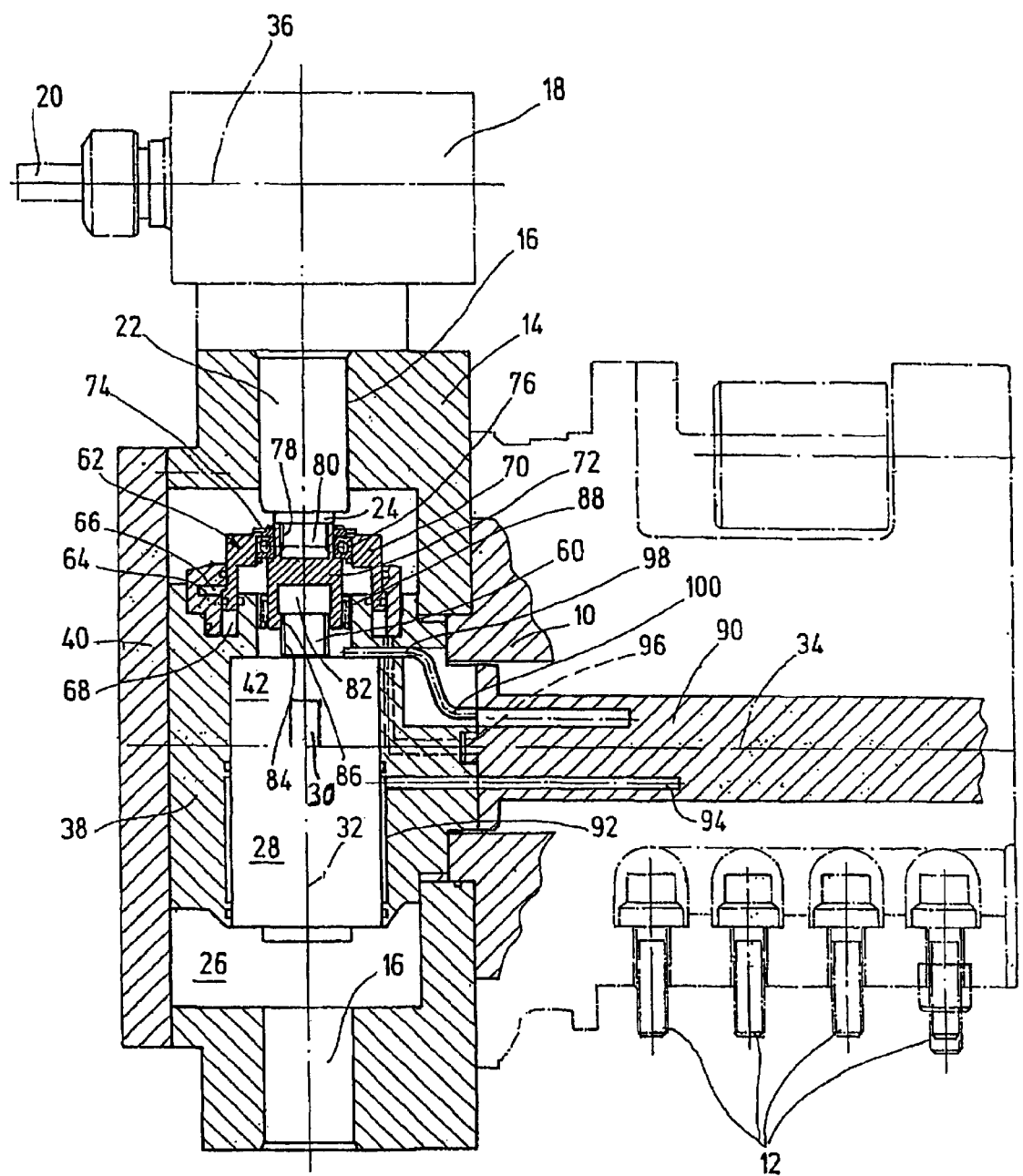
FIG. 1 is a side elevational view in partial section, of a tool turret for a machine tool according to an embodiment of the present invention.

A tool turret has a housing 10 which is secured in position on a machine tool (not shown), for example, on a slide of such machine tool, by a threaded connection 12. A tool disk or tool carrier is mounted on one end of housing 10 and is rotatable relative to the housing. The tool disk has recesses 16, for machine or machining tools 18, uniformly distributed over its circumference. The tools are configured as tool modules, and have a rotating, metal cutting tool 20, for example, one in the form of a drill or milling cutter. In the exemplary embodiment, the recesses 16 are in the form of drilled holes extending radially. A shank 22 of the machine tool may be inserted into each of these drilled holes. A drive shaft 24 projects above such shank 22. The shank 22 may be provided on its external circumference side with positioning gearing (not shown in detail), so that the machining tool 18 may always be secured in position in the recess 16 by a corresponding counterpart in the tool disk 14 as a tensioning device. For simplification of illustration; only one inserted modular machining tool 18 is been shown in FIG. 1. The tensioning device is disclosed in EP 0 585 600 B1, for example, and accordingly will not be described in greater detail at this point.

Figure 3:
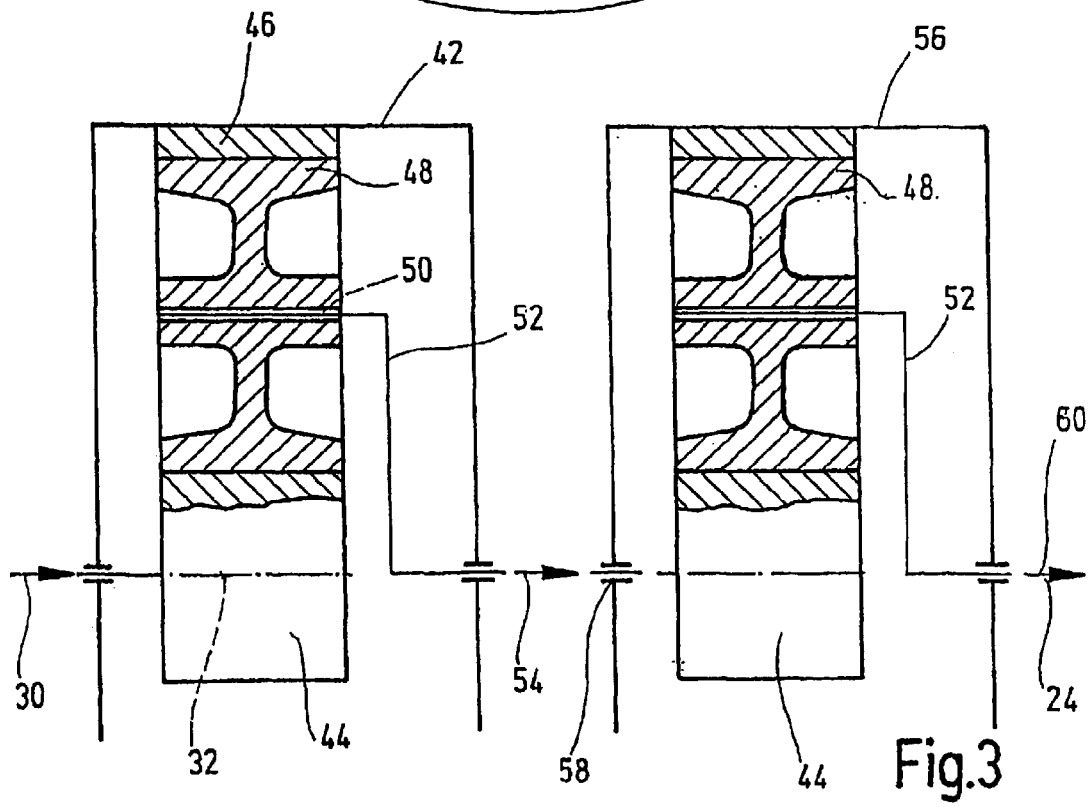
FIG. 3 is a side elevational view in section of two serially mounted planet gear units (partly shown) as viewed along line I—I of FIG. 2.

An electric drive motor 28 is mounted in the interior 26 of the tool disk 14. The driven shaft 30 of the electric motor 28, graphically shown in FIG. 1 and indicated as an extension in FIG. 3, is in alignment with the drive shaft 24 along a common axis of rotation 32. Rotation axis 32 extends perpendicularly to a longitudinal axis 34 forming the pivot axis for the tool disk 14. The machining axis 36 for the metal cutting tool 20 is mounted either in parallel with the longitudinal axis 34 and perpendicularly to the axis of rotation 32, or in parallel with the axis of rotation 32 and perpendicularly to the longitudinal axis 34.

The electric motor 28 is mounted in a motor receptacle 38, a part of the housing 10. The motor receptacle 38 is mounted to be stationary. The tool disk 14 may assume a predetermined pivot position relative to this motor receptacle 38. The tool disk 14 has, on its free frontal surface, a front cover plate 40 which covers the motor receptacle 38 externally. The inner drive configuration is readily accessible from the exterior when the plate 40 is removed. This cover feature distinctly facilitates any maintenance and repair operations.

The three-phase electric motor 28 is a three-phase synchronous motor with a very high speed, 15,000 rpm, for example. The motor is preferably in the form of an internal armature motor in which the stator (not shown) with coil windings connected to the housing of the motor 28 encloses the rotor (not shown) and with the magnet elements connected to the driven shaft 30 of the electric drive motor 28.

Figure 2:
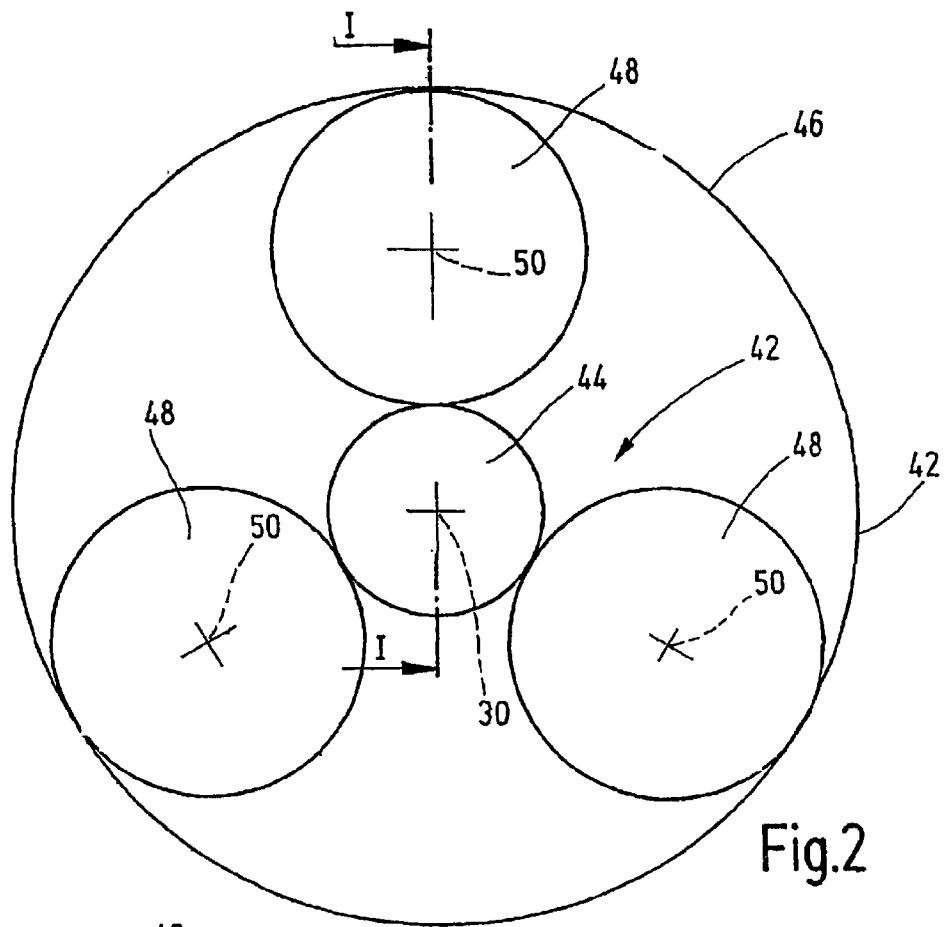
FIG. 2 is a top plan view of a planet gear unit with a driving or sun wheel and three planet gears which roll along a stationary annular gear of the tool turret of FIG. 1.

To reduce appreciably the high speed of the electric drive motor 28 for the machining tool 18, a reduction gear, preferably in the form of planet gear unit 42 is provided between the driven shaft 30 of the electric drive motor 28 and the drive shaft 24 of the machining tool 18 (see FIG. 2). The drive wheel or gear 44 of the planet gear unit 42 may be driven by the driven shaft 30 of the electric drive motor 28 (see FIG. 3). For this purpose, the driven shaft 30 extends through the gear housing 46 of the planet gear unit 42 for direct driving of the drive wheel 44. The drive wheel in turn drives three planet wheels or gears 48, only planet wheel 48 shown as being uppermost in FIG. 2 being shown in FIG. 3. The three planet wheels 48 in turn all roll along the stationary annular gear housing 46. The gear housing 46 has, on its inner circumference, gearing mating with the teeth of the planet wheels 48. Similarly, the drive wheel 44 with its external gearing is mated to the three planet wheels 48.

The planet gear unit is of conventional design, and will not be discussed in greater detail at this point. The operation of the planet gear unit 42 will be explained only to the extent necessary for understanding of the present invention. The planet wheels 48 in turn have central shafts 50 engaged in a carrier element 52, also termed "web" in technical language. The three carrier elements 52 are all guided rotatably in the central shafts 50 and are otherwise bent twice at an angle (FIG. 3) to transmit the rotary movement of the planet wheels 48 to a common driven end 54 of the planet gear unit 42. The driven end 54 is in turn engaged in the gear housing 46 for the torque transmission. If the respective driven end is connected directly to the drive shaft 24 of the machining tool 18, the speed of the drive motor 28 may be reduced by a factor of 5, so that 3000 rpm are obtained for the machining tool 18. Since the speed of the drive motor 28 is continuously variable, the speed reduction of the machining tool 18 may be predetermined over a wide range.

If the electric motor 28 generates higher speeds, which quite possibly may range from 50,000 rpm to 80,000 rpm, the first planet gear unit 42 may be coupled to a second planet gear unit 56, as is shown in diagram form in FIG. 3. The driven end 54 of the first planet gear unit 42 is guided or coupled to the input side 58 of the second planet gear unit 56. The drive wheel 44 of the second planet gear unit 56 is thus driven. This second drive wheel 44 then transmits its rotary movement to the planet wheels 48 of the second gearing 56. Driven end 60 is transmitted to the drive shaft 24 of the machining tool 18 by the carrier elements or webs 52. The configuration shown in FIG. 3 may optionally be further supplemented by serial mounting of the planetary gears (not shown), so that the speed of the electric motor 28 may be reduced in this way in specific stages. Very good speed reduction accompanied by the saving of space may be achieved with the planet gear units 42 and 56. It is also possible, however, to reduce the speed correspondingly with other sets of reduction gearing. Since in the illustrated embodiment all shaft elements 30, 54, 60, and 24 are aligned with each other, specifically, relative to the axis of rotation 32, unbalance problems are largely prevented, and quiet operation of the drive configuration free of vibration is made possible.

As is illustrated in FIG. 1 in particular, a coupling device 62 is provided between the wavelike driven end 60 of the shaft and the drive shaft 24 of the machining tool 18. The coupling device 62 is actuated by a hydraulic or pneumatic operating device 64, the coupled position being shown in FIG. 1. The operating device 64 has two annular fluid chambers 66 and 68. In the coupled position shown in FIG. 1, the lower fluid chamber 68 is under pressure applied by a pressure medium, while the upper fluid chamber 66 is more or less kept free of pressure other than pressure of surrounding air. In the respective pressure application situation, the coupling sleeve 70 is in its upper position as shown in FIG. 1 to entrain a coupling element 72 effecting the coupling process. A connecting device 74 with a ball or roller bearing 76 is provided for the entrainment movement of the coupling sleeve 70 with coupling element 72. The ball bearing 76 positions the coupling element 72 rotatably in the sleeve 70, with the coupling sleeve 70 mounted so as to be stationary. Such positioning is necessary to permit the coupling element 72 to transmit the rotary movement of the driven end 60 of the shaft to the drive shaft 24 of the machining tool 18.

For the purpose of entraining the drive shaft 24 of the machining tool 18, drive shaft 24 has on its external circumference toothing or teeth 78 for mating to interior toothing or teeth of the coupling element 72. This coupling element 72 has on its upper side, as seen in FIG. 1, a recess 80. A corresponding recess 82 is on the opposite side of the coupling element 72 so that the exterior toothing 84 may mesh with the interior toothing 86 of the coupling element 72. The interior toothing 86 is present only in the area of the lower free end of the coupling element 72. In addition, the structural depth of the recess 82 is designed so that, when the coupling element 72 is lowered over the coupling sleeve 70, the driven end 60 of the shaft may enter the second recess 82 and remain there until the drive shaft 24 of the machining tool 18 has been withdrawn and has fully cleared the recess 80.

For the lowering movement, the fluid chamber 66 is pressurized and the level of pressure in the fluid chamber 68 is lowered to the ambient pressure level. The operating device 64 then forces the coupling element 72, by way of the coupling sleeve 70 as thus pressurized, from its upper position in FIG. 1 into its lower position (not shown). In this lower position, the drive shaft 24 of the machining tool 18 is then freed and the tool disk 14 may be pivoted by appropriate actuation about its longitudinal axis 34 until another machining tool positioned in another recess 16 replaces the machining tool 18 shown. By reversal of the fluid control process for the chambers 66, 68, the coupling element 72 may be returned by way of the coupling sleeve 70 to its coupling position and the output of the motor 28 may then be transmitted to the machining tool 18 when the coupling is effected. The coupling sleeve is appropriately sealed on the inside and outside to prevent undesirable fluid escape. In order for the coupling element 72 to be able to rotate and still effect axial longitudinal displacement along the axis of rotation 32, a needle bearing cage 88 is mounted on the outer circumference side of the coupling element 72.

As has already been stated, the electric drive motor 28 is retained in a motor receptacle 38 which in turn is connected to a support 90 as a torque support. The rod-shaped support 90 accordingly carries on its free end the motor receptacle 38. On its upper side, the coupling device 62 is mounted and is integrated into the housing 10, especially in the area of its other end. The electric drive motor 28 is enclosed in a cooling device 92, the coolant lines 94 of which extend into the support 90. The heat levels accompanying the high specific performance levels may be reliably removed from the motor receptacle 38 and accordingly from the tool disk 14 by the cooling device 92. The supply lines 96 for the operating device 64 also extend into the support 90. In addition, an end position switch 98, the transmission line 100 of which also extending into the support 90, is also provided for monitoring the operating situation of the coupling sleeve 70 or for the coupling element 72. Consequently, all essential supply and information lines are carried centrally by the support 90 into the interior of the tool disk 14.

A compact drive solution is made available by the tool turret of the present invention, with very high drive output values and drive speeds. The speeds may be transmitted directly to a machining tool or suitably reduced by way of gear steps. Since all drive shafts are in alignment on a common axis, unbalance phenomena are prevented. Such prevention works to the advantage of accuracy of machining by machining tools. A slimline design is obtained and the structural space available in the tool disk is efficiently used as a result of integration of the drive configuration into the tool disk, on the housing side in particular.

While one embodiment has been chosen to illustrate the invention, it will be understood by those skilled in the art that various changes and modifications can be made therein without departing from the scope of the invention as defined in the appended claims.

What is claimed is:

1. A tool turret, comprising:
   a housing connectable to a machine tool and having a longitudinal axis;
   a tool disk mounted on said housing for rotation about said longitudinal axis relative to said housing and settable in selectable angular positions;
   recesses in said tool disk for machining tools;
   a rotating machining tool located in one of said recesses and having a drive shaft; and
   an electric drive motor mounted inside said tool disk said rotating machining tool and having a driven shaft, said shafts extending perpendicular to said longitudinal axis and being one of aligned and parallel to one another.

2. A tool turret according to claim 1 wherein said drive motor is an asynchronous motor.

3. A tool turret according to claim 1 wherein said drive motor is a rotating current synchronous motor.

4. A tool turret according to claim 1 wherein said drive motor is an internal armature motor having a stator connected to a motor housing and having coil windings enclosing a rotor with magnet elements, said rotor being connected to said driven shaft of said drive motor.

5. A tool turret according to claim 1 wherein at least one speed reducing gear unit is coupled between said shafts of said drive motor and said rotating machining tool.

6. A tool turret according to claim 5 wherein said gear unit is a single-stage planet gear unit.

7. A tool turret according to claim 5 wherein said gear unit is a multi-stage planet gear unit.

8. A tool turret according to claim 5 wherein said gear unit is a first planet gear unit, and comprises a drive gear driven by said driven shaft of said drive motor, at least one planet gear driven by said drive gear and a stationary annular gear housing, said planet wheel rolling along said annular gear housing; and
   a carrier element couples and transmits output of said planet gear, during rotation of said planet gear, to said drive shaft of said rotating machining tool.

9. A tool turret according to claim 8 wherein said first planet gear unit comprises a driven shaft; and
   a second planet gear unit comprises a drive gear driven by said driven shaft of said first planet gear unit, a planet gear and a driven shaft driven by rotation of said planet gear thereof, said driven shaft of said second planet gear unit driving said drive shaft of said rotating machining tool.

10. A tool turret according to claim 1 wherein a coupling device is mounted between said driven shaft of said drive motor and said drive shaft of said rotating machining tool.

11. A tool turret according to claim 10 wherein said coupling device is fluid pressure operated to move between a coupled position in which said driven shaft of said drive motor is coupled to and rotates said drive shaft of said rotating machining tool and an uncoupled position releasing said driven shaft of said drive motor from said drive shaft of said machining tool to allow pivoting of said tool disk about said longitudinal axis to different angular positions.

12. A tool turret according to claim 11 wherein said coupling device is hydraulically operated.

13. A tool turret according to claim 11 wherein said coupling device is pneumatically operated.

14. A tool turret according to claim 1 wherein said drive motor is stationarily mounted on a support coupled to said housing, said tool disk being rotatable about said support.

15. A tool turret according to claim 14 wherein a cooling device has coolant lines extending in said support, and is operatively coupled to said drive motor for cooling thereof.

16. A tool turret according to claim 14 wherein a coupling device is mounted between said driven shaft of said drive motor and said drive shaft of said rotating machining tool;
   said coupling device is fluid pressure operated to move between a coupled position in which said driven shaft of said drive motor is coupled to and rotates said drive shaft of said machining tool and an uncoupled position releasing said driven shaft of said drive motor from said drive shaft of said machining tool to allow pivoting of said tool disk about said longitudinal axis to different angular positions;
   an operating device moves said coupling device between the coupled and uncoupled positions;
   end position monitors are operatively coupled to said coupling device; and
   supplies lines for said operating device and said end position monitors devices extend at least partially through said support.

* * * * *